United States Patent [19]
Guerin

[11] Patent Number: 5,383,047
[45] Date of Patent: Jan. 17, 1995

[54] ROS BOW COMPENSATION

[75] Inventor: Jean-Michel Guerin, Glendale, Calif.

[73] Assignee: Xerox Corporation, Stamford, Conn.

[21] Appl. No.: 79,577

[22] Filed: Jun. 22, 1993

[51] Int. Cl.⁶ .............................................. G02B 26/08
[52] U.S. Cl. .................................... 359/209; 359/196; 359/216; 359/908; 346/108
[58] Field of Search ........................ 359/209–211, 359/196–197, 201, 205, 212, 216–219, 223, 831, 837, 900; 250/234–236; 346/108; 358/474, 494; 348/202

[56] References Cited

U.S. PATENT DOCUMENTS

| | | | |
|---|---|---|---|
| 4,770,507 | 9/1988 | Arimoto et al. | 359/211 |
| 5,237,457 | 8/1993 | Oono et al. | 359/211 |
| 5,255,115 | 10/1993 | Kikuchi | 359/209 |

FOREIGN PATENT DOCUMENTS 3-46611  2/1991  Japan ................................. 359/204

Primary Examiner—Scott J. Sugarman
Assistant Examiner—James Phan
Attorney, Agent, or Firm—Fariba Rad

[57] ABSTRACT

A raster scanner is disclosed which utilizes a rotatable glass plate for compensating for scan line bow. The rotatable glass plate provides an adjustment mechanism which can shift a collimated light beam up or down in the sagittal plane to align the center ray of the light beam with the optical axis of the imaging lens of post polygon optics. When the center ray of the light beam passes over the optical axis of the imaging lens of the post polygon optic, the bow will be reduced substantially.

4 Claims, 6 Drawing Sheets

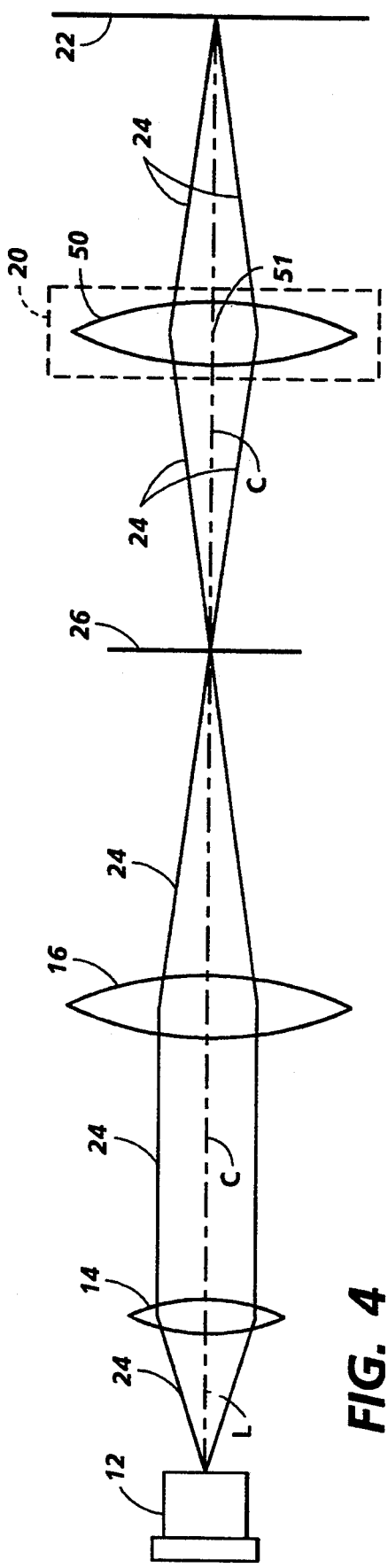
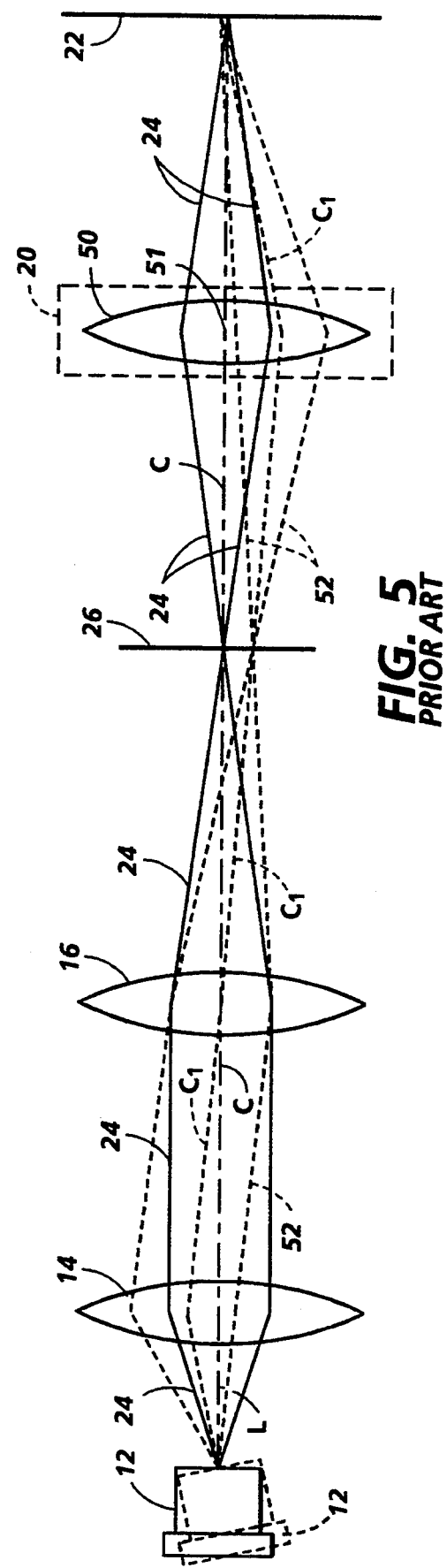
FIG. 4
PRIOR ART
FIG. 5
PRIOR ART

ROS BOW COMPENSATION

DESCRIPTION OF THE PREFERRED EMBODIMENT

This invention relates to a raster scanner and, more particularly, to a raster scanner system which utilizes an optical element for compensating a bow of a scan line.

Other objects will become apparent from the following description with reference to the drawings wherein:

FIG. 4 shows a sagittal view of a correct path of a light beam through a prior art raster scanner;

FIG. 5 shows an example of an error which has been introduced by a laser diode of a prior art raster scanner;

Figure 1:
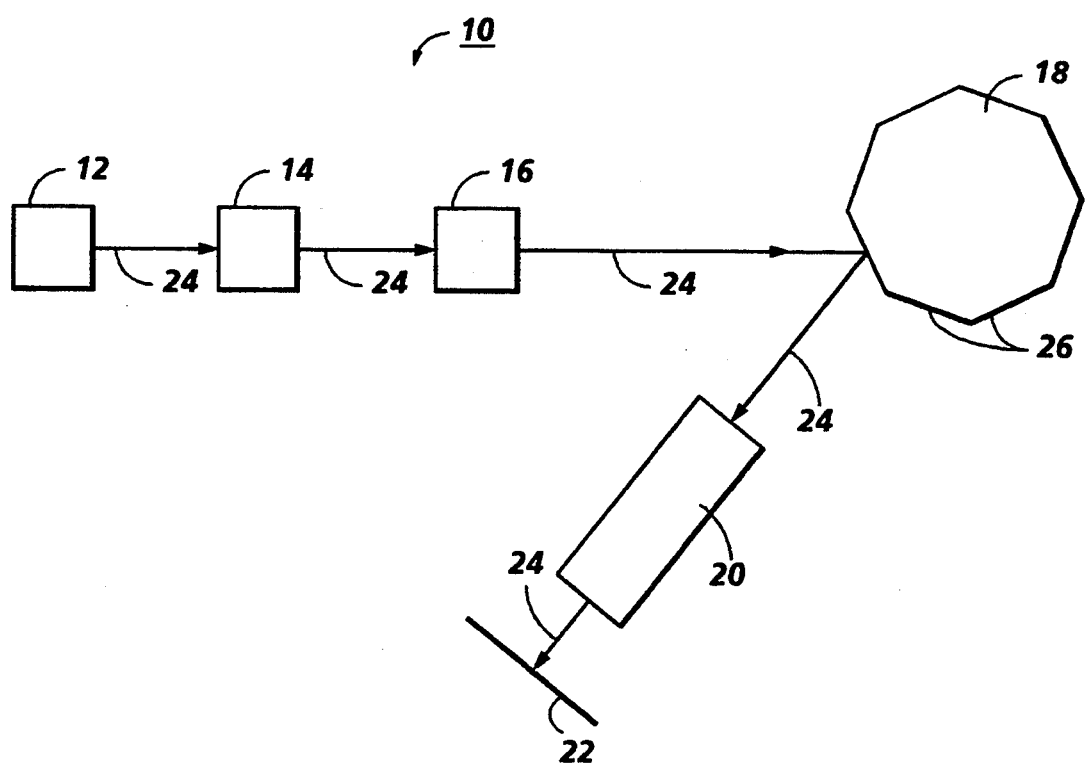
FIG. 1 is a top view of a prior an raster output scanner.

Referring to FIG. 1, a conventional raster scanner system 10 utilizes a light source 12, a collimator 14, pre-polygon optics 16, a multi-faceted rotating polygon mirror 18 as the scanning element, post polygon optics 20 and a photosensitive medium 22. The light source 12, which can be a laser source, produces a light beam 24 and sends it to the rotating polygon mirror 18 through the collimator 14 and the pre-polygon optics 16. The collimator 14 collimates the light beam 24 and the pre-polygon optics 16 focuses the light beam in the sagittal or cross-scan plane onto the rotating polygon mirror 18. The rotating polygon 18 has a plurality of facets 26 each of which is a plane mirror. The facets 26 of the rotating polygon mirror 18 reflect the light beam 24 and also cause the reflected light 24 to revolve about an axis near the reflection point of the facet 26 of the rotating polygon mirror 18. This reflected light beam can be utilized through the post polygon optics 20 to scan a document at the input end of an imaging system as a raster input scanner or can be used to impinge upon a photographic film or a photosensitive medium 22, such as a xerographic drum (photoreceptor), at the output of the imaging system.

In real world situations, a raster scanner typically includes a number of lenses and mirrors to accommodate a specific design. Unavoidable imprecision in the shape and/or mounting of these optical elements will inevitably introduce certain anomalies in the quality of the scan line on the photoreceptor. One of such anomalies is a bow.

Bow is an undesirable character of a scan line which does not form a straight line and bows about a central midpoint. Typically a bow is described by a polynomial such as $(ax^2+bx^3+cx^4+\ldots)$. However, this invention is principally aimed at reducing the even order aberrations such as $(x^2, x^4)$. An example of a bow is shown by scan line 30 in FIG. 2. Depending on the types of imprecision in the construction of the apparatus, the bow may bend in either direction relative to a bow free line 32. A bow 30 situated downward is called a frown and a bow 34 (FIG. 3) situated upward is called a smile.

In a monochromatic system, if the difference between the ends of a bow and the center of the bow is kept below 100 microns, the bow does not create a major problem in the quality of the print or copy. However, in color printing, if for each color a different raster scanner is used, then each raster scanner can have a bow which is different than the bow of the other raster scanners. If the bow of one raster scanner happens to be a smile while the bow of the other raster scanner happens to be a frown, then the two raster scanners will create two spots on the photoreceptor which do not align over each other and therefore create a problem known as misregistration. Usually, there are more than two raster scanners involved in color printing which make the misregistration problem even more complex.

Typically a bow happens when the center ray of a light beam scanning a lens does not scan along the optical axis of the lens. The farther the center ray of a beam is from the optical axis of the lens, the more the curvature of the bow.

In a raster scanner, due to the manufacturing tolerances of the optical elements and the rotating polygon mirror and also due to the imprecision introduced during the assembly, the light beam reflected from the rotating polygon mirror may scan through the post polygon optics with a center ray which is offset compared to the optical axis of the imaging lens of the post polygon optics causing a bow on the printed line.

It should be noted that in a scanning system, since the light beam scans a photoreceptor in a tangential plane, the optical axis of the imaging lens, which is perpendicular to the sagittal plane, is the critical axis in generation of a bow.

In a raster scanner, the post polygon optics typically include multiple lenses which relay the spot on the polygon facet onto the photoreceptor. Different raster scanners utilize different kinds of optical elements to relay the light beam onto the photoreceptor. Regardless of the types of optical elements contained in the post polygon optics 20, for the purpose of describing this invention, in the sagittal plane, these optics can be effectively reduced to a single optical element which hereinafter will be called "imaging lens". Also, for the purpose of sagittal plane discussion, the imaging lens can be considered to be a lens which is cylindrical in the sagittal plane and planar in the tangential or fast scan plane. Finally, hereinafter, the optical axis of the imaging lens which is perpendicular to the sagittal plane will be referred to as the "optical axis of the imaging lens".

It is the optical axis of the imaging lens that is critical to the generation of a bow. In other words, if the center ray of the light beam scans the imaging lens along its optical axis, the emerging light beam will generate a straight line on the photoreceptor plane. In a raster scanner, which has a plurality of optical elements, the error (deviation of the center ray of the light beam from the optical axis of the raster scanner) can be introduced by any optical element including the laser diode. Also, different errors can be introduced to the light beam by different optical elements of the raster scanner in which case the error is cumulative. Therefore, the errors introduced by the optical elements can substantially shift the center ray of the light beam from the optical axis of the imaging lens of the post polygon optics which will cause a bow on the printed document.

Referring to FIG. 4, there is shown a sagittal view of a correct path of a light beam 24 through a prior art raster scanner which does not have a bow. For the purpose of simplicity, the facet 26 of the rotating polygon mirror is shown as line 26 and the reflected beam from the facet 26 is unfolded. Also, for simplicity, it is assumed that in the sagittal plane, the post polygon optics 20 has only one optical element and that is an imaging lens 50. In the sagittal plane, the imaging lens 50 is responsible for relaying the spot on the polygon facet onto the photoreceptor plane 22. In an error free system, the optical axes of all the lenses cross the optical axis L of the raster scanner and the center ray C of the light beam 24 is coincident with the optical axis L of the raster scanner. Since the center ray C of the light beam 24 scans the imaging lens 50 along its optical axis 51 (perpendicular to the sagittal plane), the emerging light beam will scan a straight line on the photoreceptor plane 22.

Referring to FIG. 5, there is shown an example of an error which has been introduced at the laser diode 12. In this example, the laser diode 12 has not been assembled properly and therefore, the light beam 52 (shown by dashed lines) from this laser diode 12 is slightly off from the correct path of the light beam. For the purpose of the clarity of the drawings, the deviation of all the light beams in all the drawings of this specification have been exaggerated.

Figure 2:
FIG. 2 shows a bow of a scan line situated downward which is called a frown.

In the example of FIG. 5, for the purpose of comparison, there is also shown a light beam 24 (shown by solid lines) which does not have any errors. Since the center ray $C_1$ of the light beam 52 scanning through the imaging lens 50 does not scan along the optical axis 51 of the imaging lens 50, the emerging light beam will scan a bow shaped path (as shown in FIG. 2) on the photoreceptor plane 22 rather than a straight line.

Consequently, to correct the bow problem, the light beam must be shifted to a location so that the center ray $C_1$ of the light beam 52 will scan the imaging lens 50 along its optical axis 51.

Figure 6:
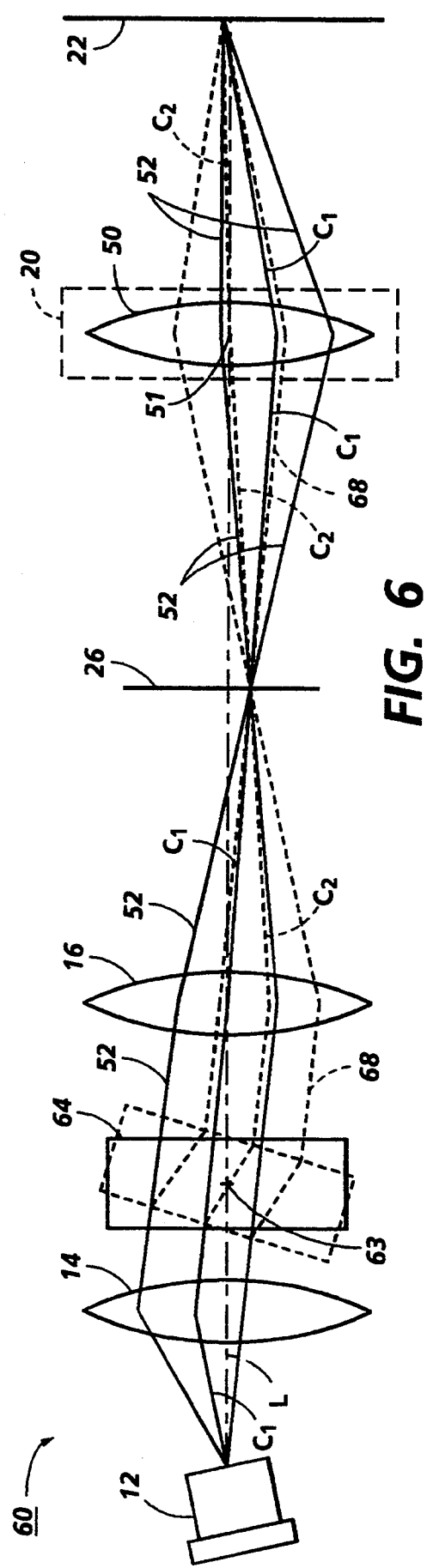
FIG. 6 shows the raster scanner of this invention correcting the error illustrated in FIG. 5 which is introduced by the laser diode.

Referring to FIG. 6, a raster scanner 60 of this invention which utilizes a bow compensation element 64 is shown. All the elements from the prior art are designated by the same reference numerals. For the purpose of simplicity, the facet 26 of the rotating polygon mirror is shown as line 26 and the reflected beam from the facet 26 is unfolded. Also, for simplicity, it is assumed that the post polygon optics 20 has only one optical element and that is an imaging lens 50.

In this invention a rotatable glass plate 64 is placed between the collimator 14 and the pre-polygon optics 16. The glass plate 64 can rotate in the sagittal plane (the plane of the glass 64) about an axis which is perpendicular to the sagittal plane and passes through the center 63 of the glass plate. Since the glass plate 64 is located in the path of the collimated light beam, by rotating the glass plate 64, the light beam will shift up or down in the sagittal plane depending on the direction of the rotation of the glass plate 64 while the collimation of the light beam is maintained. The glass plate 64 does not have any magnification power and therefore it will only shift the light beam up or down. After the glass plate is rotated by any well known means, it will be fixed to keep the desired position.

It should be noted that the glass plate will be rotated at the last stage of the assembly to reduce any bow caused by any error introduced during the assembly or by different optical elements.

The rotation of the glass plate 64 is restricted to the sagittal plane due to the fact that the bow is caused by the misalignment of the light beam in the sagittal plane. Since the rotation of the glass plate 64 is in the sagittal plane, the light beam will be shifted only in the sagittal plane. Also, since the light beam in tangential plane is unaffected throughout the system, hereinafter the light beam will be described only in the sagittal plane. However, it should be noted that although the tangential optical elements theoretically should not affect the light beam in the sagittal plane, due to manufacturing imprecision and unavoidable cross-coupling in the post polygon optics, it is found that they generally do introduce some errors to the light beam.

As it was mentioned previously, the error can be introduced at any optical element. In the example of FIG. 6, there is shown a light beam 52 (solid lines) which has an error that was introduced at the laser diode 12. The light beam 52 has a center ray $C_1$ which does not scan the imaging lens 50 along its optical axis 51. As a result, the emerging light will generate a line with a bow on the photoreceptor plane 22.

Without rotating the glass plate, the pre-polygon optics 16 receives the light beam 52 and focuses the light beam 52 on the facet 26 of the polygon. By rotating the glass plate 64, the light beam 52 will be shifted to a position shown by the dashed lines 68. When the glass plate 64 is rotated, the pre-polygon optics 16 receives the shifted light beam 68 (shown by the dashed lines) at a location which is either above or below the location of the unshifted light beam 52.

Pre-polygon optics 16 focuses the light beam on the facet 26 of the polygon. However, the light beam 68 strikes the facet 26 with a different angle than the angle of the unshifted light beam 52. This causes the rotating polygon mirror to reflect the light beam 68 with a different angle than the angle of the unshifted light beam 52 and therefore, the imaging lens 50 receives the light beam 68 above or below (in this example above) the unshifted light beam 52.

Depending on if the center ray of the unshifted light beam 52 is above or below the optical axis 51 of the imaging lens 50, the glass plate 64 can be rotated clockwise or counter clockwise respectively. Also, depending on how far the center ray of the unshifted light beam 52 is away from the optical axis 51 of the imaging lens 50, the degree of the rotation can be determined. By the proper rotation of the glass plate 64, the center ray $C_2$ of the shifted light beam 68 scans the imaging lens 50 along its optical axis 51 and therefore, the light beam on the photoreceptor scans a substantially straight line.

Referring back to FIG. 4, the error free light beam 24 is relayed onto the photoreceptor on the optical axis L of the raster scanner. However, referring to FIG. 6, the shifted light beam 68 is relayed onto the photoreceptor at a position which is above the optical axis L of the raster scanner. The distance between the relayed light which is shifted by the rotatable glass plate and the optical axis is in the range of 1 micron to 100 microns which is still in the tolerance range of the movement of the scan line.

Figure 3:
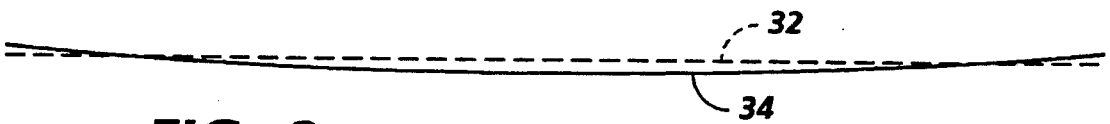
FIG. 3 shows a bow of a scan line situated upward which is called a smile.
Figure 7:
FIG. 7 shows the bow of the scan line of FIG. 2 after it has been reduced by the raster scanner of this invention.
Figure 8:
FIG. 8 shows the bow of the scan line of FIG. 3 after it has been reduced by the raster scanner of this invention.

The rotatable glass plate 64 is capable of reducing the frown shown in FIG. 2 and the smile shown in FIG. 3 to substantially straight lines 70 and 72 shown in FIGS. 7 and 8 respectively.

It should be noted that the raster scanner system of this invention is capable of correcting the bow caused by any pre-polygon or post polygon optical element or the combination of the pre-polygon and the post polygon optical elements.

Figure 9:
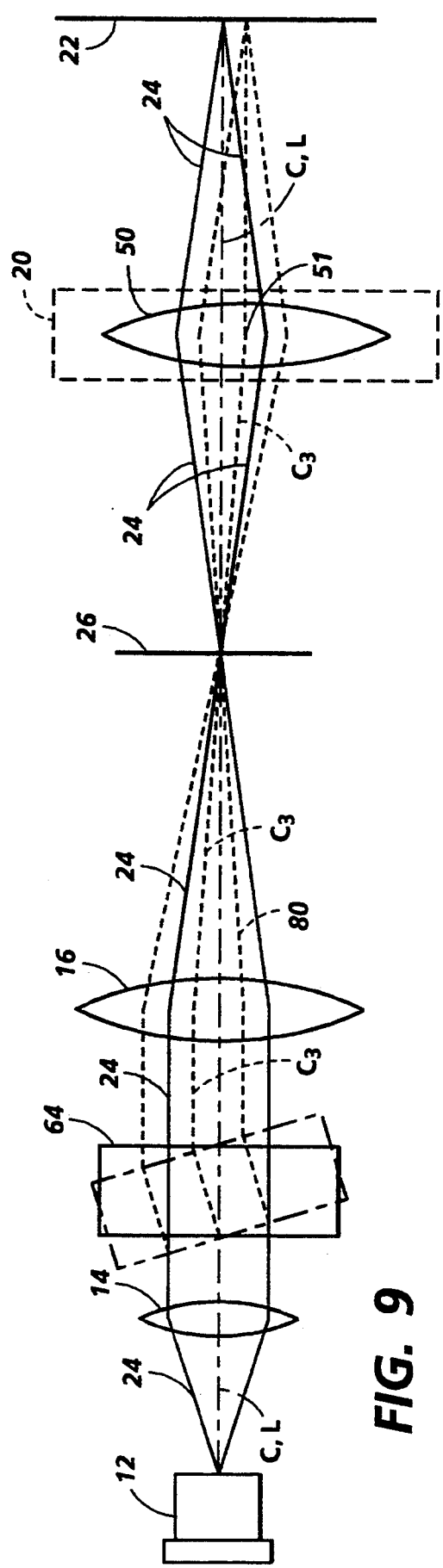
FIG. 9 shows the raster scanner of this invention correcting an error which is introduced by the post polygon optics.

FIG. 9 shows an example of an error which is introduced at the post polygon optics 20 and it is corrected by the rotation of the glass plate 64. Again for simplicity, it is assumed that the post polygon optic 20 has only one element and that is an imaging lens 50. In this example, the light beam 24 (shown by solid lines) travels a correct path meaning that the center ray C of the beam 24 is coincident with the optical axis L of the raster scanner 60. However, during the assembly, the imaging lens 50 is not assembled properly and therefore, the optical axis 51 of the imaging lens 50 is slightly off from the optical axis L of the raster scanner 60. As a result, the center ray C of the light beam 24 does not scan the imaging lens 50 along its optical axis 51 which consequently causes a bow. By rotating the glass plate 64, the light beam 24 will be shifted to a position (shown by dashed lines 80) so that the center ray $C_3$ of the shifted light beam 80 will scan the imaging lens 50 along its optical axis 51.

Due to the manufacturing tolerances of different elements and the imprecision introduced during the assembly the error introduced to the light beam can be cumulative. For example, the optical axis of the first element can be below the optical axis of the raster scanner while the optical axis of the second element can be above the optical axis of raster scanner or many different variations of errors. The glass plate 64 of this invention is also capable of compensating for the bow caused by multiple errors.

The invention disclosed in this embodiment provides a last stage assembly adjustment. After the assembly of the raster scanner is completed, if the scan line on the photoreceptor plane has a bow, then the glass plate can be rotated until the bow disappears and then the glass plate can be fixed in that position. In addition, the bow correction system of this invention can be mechanized to correct any bow automatically.

It should be noted that for the purpose of describing this invention the post polygon optics were effectively reduced to one imaging lens. However, in a real raster scanner, there are multiple optical elements which are responsible for relaying the spot from the polygon to the photoreceptor plane. Therefore, in an actual raster scanner, there are multiple imaging lenses with multiple optical axis. As a result, to correct a bow, the glass plate has to be rotated until the center ray of the light beam scans along the effective optical axis of the combined multiple imaging lenses.

It should also be noted that the raster scanners which in the sagittal plane send a collimated light beam to the polygon rather than focusing the light beam on the polygon can also utilize the glass plate of this invention to reduce a bow caused by that system.

It should further be noted that the glass plate of this invention can be replaced by a plastic plate or any other material which can function in the same manner as the glass plate.

What is claimed is:

1. A raster output scanner comprising:
   a light source emitting a light beam;
   collimating means located in the path of the light beam from said light source and being so constructed and arranged to collimate the light beam;
   a medium;
   scanning means located in the path of the light beam and being so constructed and arranged to scan the light beam in a tangential plane across said medium;
   imaging means located in the path of the light beam directed from said scanning means for receiving the light beam and relaying the light beam on said medium;
   shifting means located in the path of the light beam;
   said shifting means being rotatable about an axis which extends generally perpendicular to a sagittal plane for shifting the light beam in the sagittal plane;
   said collimating means being optically located between said light source and said shifting means;
   said shifting means being optically located between said collimating means and said scanning means;
   the light beam having a center ray;
   said imaging means having an effective optical axis perpendicular to the sagittal plane, and
   said shifting means is so constructed and arranged to shift the light beam in such a manner that the center ray of the light beam scans said imaging means along said effective optical axis of said imaging means.

2. The raster output scanner as recited in claim 1, wherein said shifting means is a glass plate.

3. The raster output scanner as recited in claim 1, wherein said shifting means is a transparent plastic plate.

4. A method for correcting a bow of a scan line, in a raster output scanner which comprises a light source emitting a light beam, a collimator, a scanning means producing a scan line, a shifting means located between the collimator and the scanning means, an imaging means and a medium, the method comprising the step of correcting the bow of the scan line by moving the shifting means to shift the light beam between the collimator and the scanning means in a sagittal plane in such a manner that a center ray of the shifted light beam scans the imaging means along its optical axis.

* * * * *